United States Patent
Kaneda

[11] Patent Number: 5,355,043
[45] Date of Patent: Oct. 11, 1994

[54] BRUSHLESS POLYPHASE DC MOTOR
[75] Inventor: Isao Kaneda, Moriyama, Japan
[73] Assignee: Nippon Densan Corporation, Kyoto, Japan
[21] Appl. No.: 939,168
[22] Filed: Sep. 2, 1992
[30] Foreign Application Priority Data
Sep. 10, 1991 [JP] Japan .................. 3-230108
[51] Int. Cl.⁵ .................. H02K 11/00; H02K 21/12
[52] U.S. Cl. .................. 310/156; 310/67 R; 310/181; 310/267
[58] Field of Search ............ 310/156, 181, 254, 259, 310/265, 267, 67 R

[56] References Cited
U.S. PATENT DOCUMENTS

| | | | |
|---|---|---|---|
| 4,667,137 | 5/1987 | Macleod | 318/254 |
| 4,700,098 | 10/1987 | Kawashima | 310/186 |
| 4,965,476 | 10/1990 | Lin | 310/51 |
| 5,006,943 | 4/1991 | Elsässer et al. | 360/99.08 |
| 5,030,864 | 7/1991 | Van Hout et al. | 310/67 R |
| 5,057,731 | 10/1991 | Hancock | 310/180 |
| 5,093,595 | 3/1992 | Korbel | 310/156 |
| 5,138,213 | 8/1992 | Sottek | 310/269 |
| 5,157,295 | 10/1992 | Stefansky et al. | 310/90 |
| 5,164,622 | 11/1992 | Kordik | 310/67 R |

FOREIGN PATENT DOCUMENTS
0495611A2 1/1992 European Pat. Off. .

Primary Examiner—Steven L. Stephan
Assistant Examiner—D. R. Haszko
Attorney, Agent, or Firm—McCormick, Paulding & Huber

[57] ABSTRACT

A brushless polyphase DC motor is applied to a spindle motor for a disk device and has a stator generating a magnetic field in an excited state and a rotor obtaining turning force by the electromagnetic interaction with the stator. When an electrical charge current is intermittently and alternately supplied to the coil of the stator in opposite directions, for example, if electrical charge is stopped after current in the normal direction is supplied, a residual magnetic field density is generated in the stator during the stopping period. The residual magnetic flux density is employed for performing electrical charge in the reverse direction by supplying current in the reverse direction. In this case, a high torque is generated by increasing a change in the magnetic flux density.

8 Claims, 3 Drawing Sheets

BRUSHLESS POLYPHASE DC MOTOR

BACKGROUND OF THE INVENTION

1. Field of the Invention

The present invention relates to a brushless polyphase DC motor, and particularly to a technique which is effectively applied to a brushless polyphase DC motor and which enables an increase in torque during rotation in a spindle motor for a magnetic disk device.

2. Description of the Related Art

A brushless DC motor, for example, comprising a stator generating a magnetic field in an excited state and a rotor obtaining turning force by the electromagnetic interaction with the stator is frequently used as a spindle motor for a magnetic disk device. The rotation of such a brushless DC motor is controlled by an electronic circuit formed into a semiconductor chip.

For example, in a three-phase coil brushless polyphase DC motor, each of coils is intermittently and alternately charged with electricity in opposite directions by synchronously supplying currents flowing in a normal direction, stopping and flowing in a reverse direction to generate a magnetic flux in each of cores, as shown in EUROPEAN PATENT APPLICATION Publication No. 0495611 A2. In this case, the waveform of the magnetic flux density is substantially the same as that of the current supplied to the coils.

The motor can be driven by attraction and repulsion between the magnetic flux density and a permanent magnet for generating driving force (torque). In this case, the intensity of the torque T has the relational expression, T (torque) $\alpha i$ (current) . $\Delta B$ (change in magnetic flux density) , i.e., the torque is in proportion to the current and the change in magnetic flux density. The torque is thus increased by increasing the current or the change in magnetic flux density.

However, since the waveform of the magnetic flux density produced in each of the cores is substantially the same as that of the current supplied to each of the coils in a conventional brushless polyphase DC motor, the current must be increased for increasing the torque, thereby causing the problem of increasing the capacity of a power source.

The applicant of this invention has proposed a method of obtaining a large change in the magnetic flux density by double stepping drive in which a current is converted from the normal direction to the reverse direction without a stopping period at the starting of a motor, thereby generating a high torque. However, in this case, since the motor is rotated with a high torque only at the starting thereof, and since currents flowing in the normal direction, stopping and flowing in the reverse direction are supplied during the rotation of the motor, the torque waveform is a general waveform, and thus the torque cannot be increased during the rotation.

SUMMARY OF THE INVENTION

It is an object of the present invention to provide a brushless polyphase DC motor which enables an attempt to be made to increase torque by obtaining a large change in magnetic flux density during rotation of a motor.

The above object and other objects and novel characteristics of the present invention will be made apparent from the description of the specification and attached drawings.

DESCRIPTION OF THE PREFERRED EMBODIMENTS

A first embodiment of the present invention is described below with reference to FIGS. 1 to 5.

Figure 1:
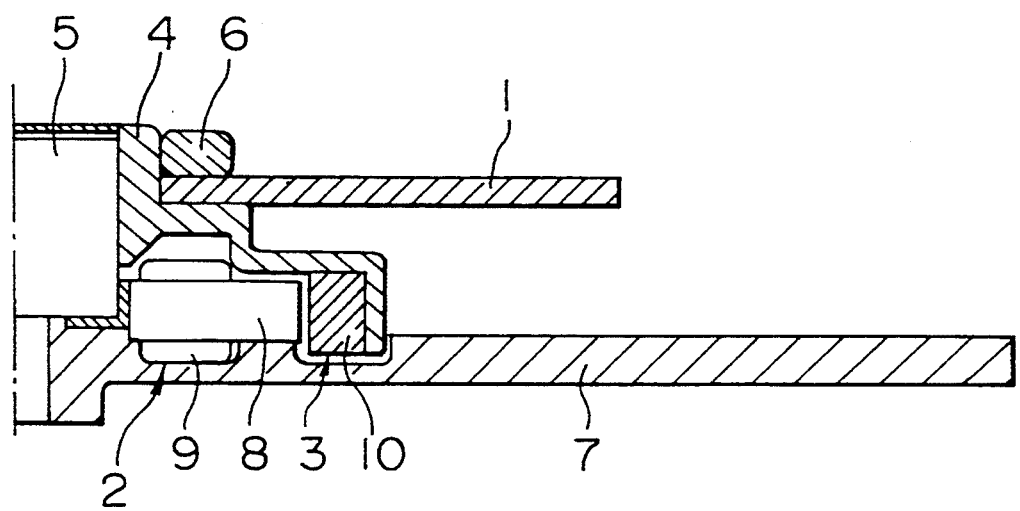
FIG. 1 is a partially sectional view showing a principal portion of a brushless polyphase DC motor in accordance with a first embodiment of the present invention.

FIG. 1 shows a brushless polyphase DC motor in accordance with the first embodiment of the present invention. The brushless polyphase DC motor of this embodiment is applied to, for example, a spindle motor for the disk device of a magnetic disk 1. The motor comprises a stator 2 generating a magnetic field in an excited state, a rotor 3 obtaining turning force by the electromagnetic interaction with the stator 2, a spindle hub 4 fixed to the rotor 3, a bearing 5 for rotatably supporting the spindle hub 4, and a disk clamp 6 for holding the magnetic disk 1, all of which are mounted on a base plate 7.

The stator 2 is intermittently and alternately excited in opposite directions so that magnetization remains in a direction which causes an increase in the change in the magnetic flux density during the stopping period for the next reverse direction electrical charge.

Figure 2:
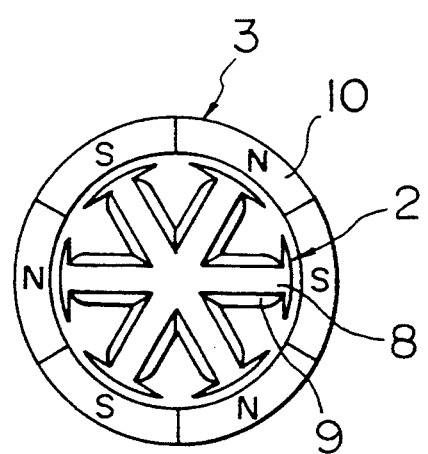
FIG. 2 is a schematic explanatory view showing a stator and a rotor in the first embodiment.
Figure 3:
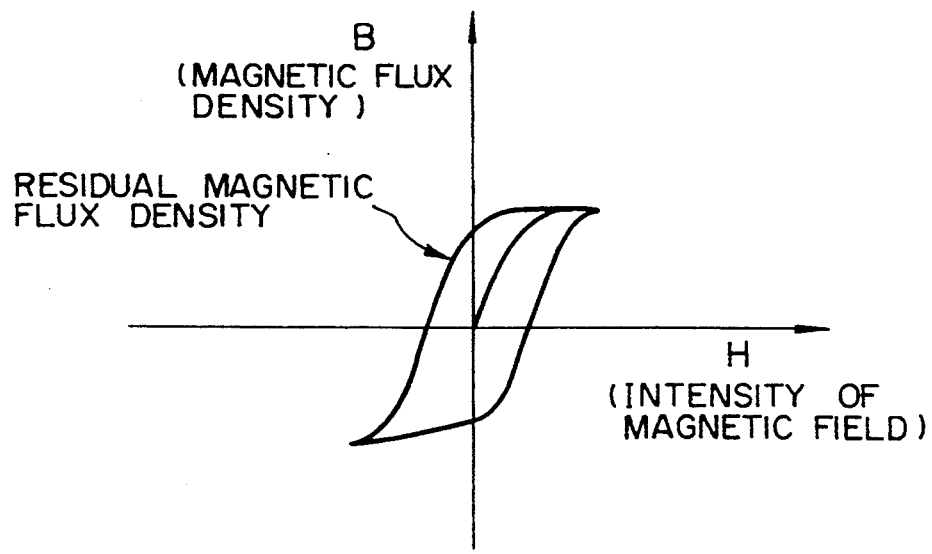
FIG. 3 is an explanatory view showing the hysteresis curve of the stator core in the first embodiment.

The stator 2 is, for example, provided with six poles, as shown in FIG. 2. The stator core 8 is made of a material containing a magnetic substance with high residual magnetization, such as an annealed material of silicon electric steel, an iron sheet material with a high carbon content or the like, i.e., a magnetic substance having a high residual magnetic flux density shown by a intersection with the magnetic flux density on the ordinate in the hysteresis curve showing a relation between the magnetic flux density and the intensity of the magnetic field, as shown in FIG. 3. The stator core 8 is preferably made of a material containing a magnetic substance having large magnetic after-effects in relation to the residual magnetic flux density. A coil 9 is wound on each of the magnetic poles of the stator core 8.

A magnet 10 divided into six magnetic poles is disposed on the rotor 3, as shown in FIG. 2 so that the rotor 3 and the stator synchronize with each other by the same number of magnetic poles. The magnet 10 comprises a material having a high residual magnetic flux density, such as a rare earth magnet or the like.

Figure 4:
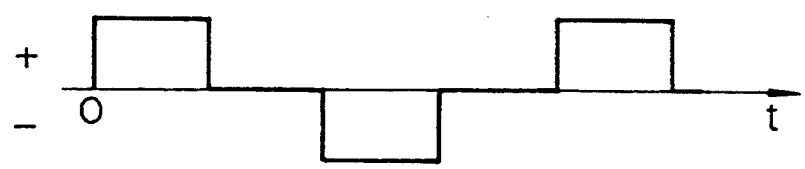
FIG. 4 is a drawing showing the waveform of electrical charge in the first embodiment.
Figure 5:
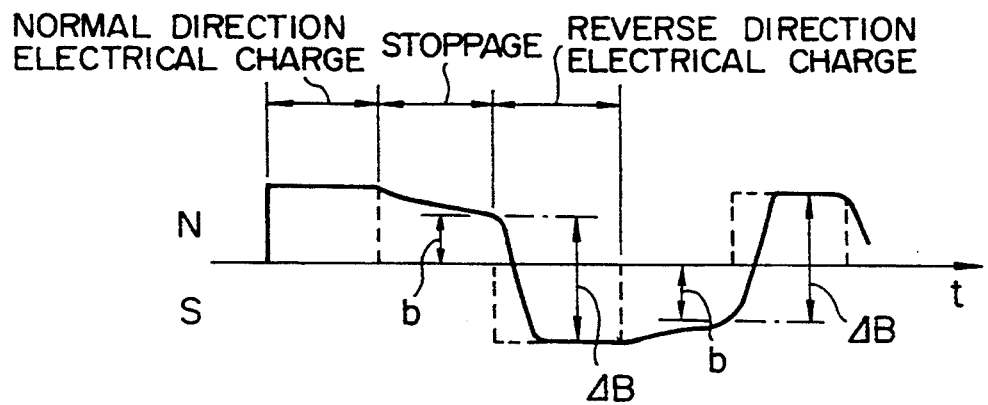
FIG. 5 is a drawing showing the waveform of a magnetic flux density in the first embodiment.

In the brushless polyphase DC motor configured as described above, when the electrical charge current shown in FIG. 4 is supplied to the coil 9 of the stator 2, the waveform of the magnetic flux density shown in FIG. 5 is obtained. Namely, if electrical charge is stopped after the current in the normal direction is supplied, the residual magnetic flux density b shown in FIG. 5 is generated in the stator core 8 during the stopping period.

The residual magnetic flux b is employed for performing electrical charge by supplying current in the reverse direction during the time magnetism remains. In this case, the change in the magnetic flux density ΔB is increased, as shown in FIG. 5, whereby higher torque than than in prior art (at the maximum, twice that in prior art) can be generated.

Namely, when a magnetic flux is generated in a magnetic substance having a low residual magnetic flux density, if electrical charge is stopped, the waveform of the current is substantially the same as that of the flux density because the magnetic flux is opened, and the residual magnetization returns to zero. However, when a magnetic substance having a high residual magnetic flux density and/or large magnetic after-effects is used, if electrical charge is stopped, some magnetism can be allowed to remain for a short time.

This permits next electrical charge to be performed by employing the residual magnetic flux density during the time magnetism remains, and a high torque to be generated due to an increase in the change in the magnetic flux density. An attempt can thus be made to increase the torque during rotation.

In the brushless polyphase DC motor of the first embodiment, since the stator core 8 contains a magnetic substance having high residual magnetization, magnetization can be allowed to remain in a direction which causes an increase in the change in the magnetic flux density for the next electrical charge in the reverse direction during the stopping period in the intermittent excitation of the stator 2. This residual magnetic flux density can be employed for rotation with high torque by the next electrical charge.

In this case, on the basis of the relation between the sectional area of the stator core 8 and the torque, for example, if the torque is set to the same level as a conventional level, the sectional area of the stator core 8 can be reduced to about half of that of a conventional design, whereby the size of the motor can be decreased.

A second embodiment of the present invention is described below with reference to FIGS. 6 to 8.

Figure 6:
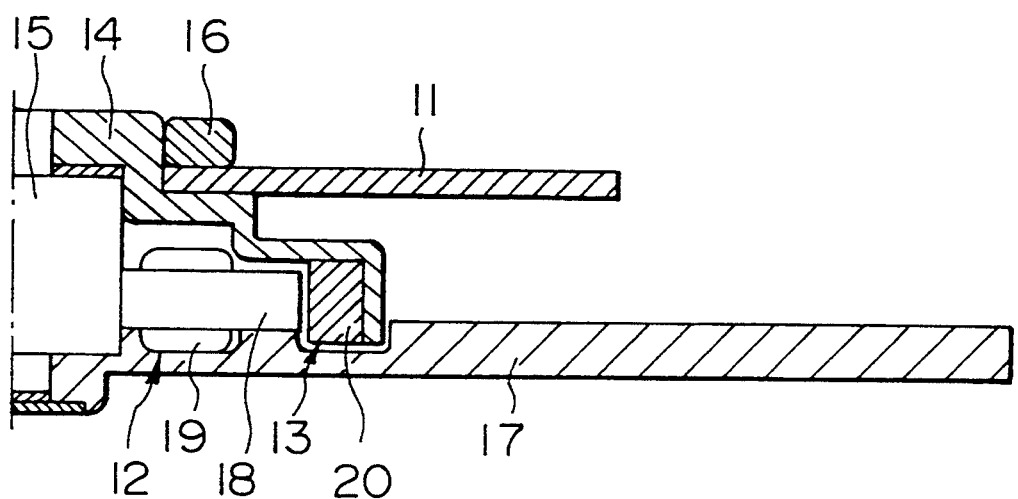
FIG. 6 is a partially sectional view showing a principal portion of a brushless polyphase DC motor in accordance with a second embodiment of the present invention.

FIG. 6 shows a brushless polyphase DC motor in accordance with the second embodiment of the present invention. The brushless polyphase DC motor of this embodiment is applied to a spindle motor for the disk device of a magnetic disk 11 in the same way as in the first embodiment. The brushless polyphase DC motor comprises a stator 12 having a stator core 18 on which a coil 19 is wound, a rotor 13 to which a magnet 20 is fixed, a spindle hub 14, a bearing 15, a disk clamp 16, and a base plate 17.

Figure 7:
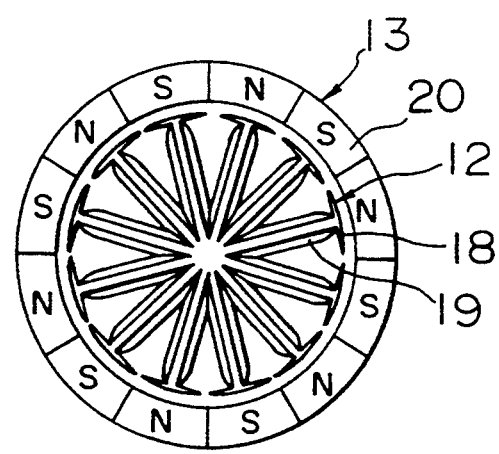
FIG. 7 is a schematic explanatory view showing a stator and a rotor in the second embodiment.
Figure 8:
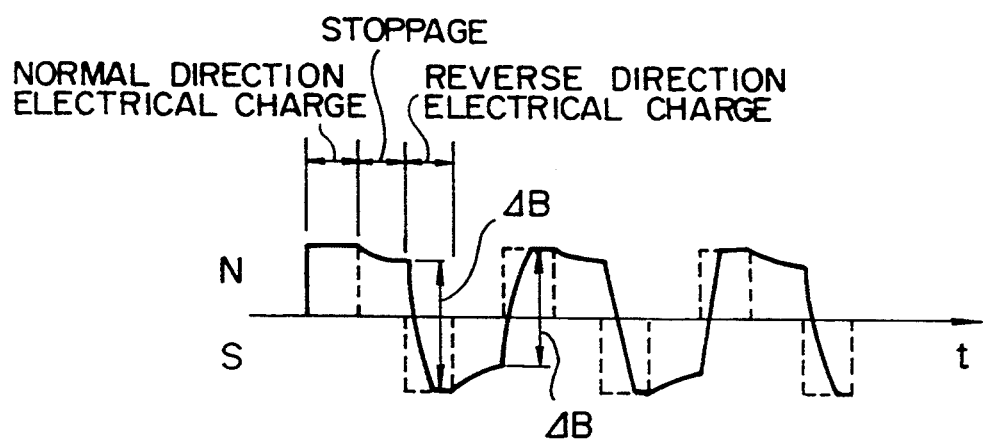
FIG. 8 is a drawing showing the waveform of a magnetic flux density in the second embodiment.

In this embodiment, the stator 12 is, for example, provided with twelve poles, as shown in FIG. 7, and the rotor 13 is also divided into twelve poles so that the speed at which the magnetic flux cuts the magnetic poles is increased.

The brushless polyphase DC motor of this embodiment permits rotation with a high torque employing the residual magnetic flux density in the same way as in the first embodiment. In addition, since the number of magnetic poles is increased to a value of twice that of the first embodiment, the period of the change in magnetic flux density is decreased, as shown in FIG. 8, and the excitation period can thus be decreased to about half of that of the first embodiment, thereby further increasing the torque during rotation.

Although the present invention is described in detail above with reference to the first and second embodiments, the invention is not limited to the embodiments, and various changes can be made within the scope of the gist of the invention.

For example, the brushless polyphase motors of the first and second embodiments respectively concern the case where the stator 2 contains a magnetic substance having high residual magnetization, and the case where the number of magnetic poles of the stator 2 and the rotor 3 is increased. However, the present invention is not limited to the above embodiments, the invention can be applied to the case where the excitation period is decreased by increasing the rotational speed of the motor. In this case, the interrelation between the conditions of the rotational speed of the motor, the number of poles and the number of divisions of the magnet, and the magnetic material used is selected so that magnetization remains in a direction which causes an increase in the change in the magnetic flux density.

In addition, although the above embodiments respectively concern the cases where the numbers of poles of the stators 2, 12 are 6 and 12, the number can be of course changed to another value such as 3 or 9. Further, when the numbers of magnetic poles of the rotors 3, 13 are larger than those of the stators 2, 12, respectively, the excitation period of the stators 2, 12 is relatively decreased, and the change in the magnetic flux density of the stators 2, 12 can thus be increased.

Although the case where the present invention is applied to a spindle motor for a magnetic disk device in the field of the present invention is mainly described above, the present invention is not limited to this. For example, the present invention can be widely applied to brushless polyphase DC motors used in other apparatuses such as a laser printer and the like.

What is claimed is:

1. A brushless polyphase DC motor comprising a stator having a stator core and a plurality of phases of coils wound on the stator core, a rotor having a magnet disposed in opposition to the stator, an electric current in the positive direction and an electric current in the negative direction being alternately supplied to each of the coils of the plurality of phases with a stopping period therebetween, the stator and the rotor being rotated relative to each other by an electromagnetic interaction generated with the supply of these electric currents, and means for maintaining a substantial residual magnetization in the stator core upon termination of each stopping period so that when an electric current in the positive direction or negative direction is supplied to each coil after the stopping period, the magnetic flux density of the stator core changes from negative or positive to positive or negative, and there is a substantial change in the magnetic flux density at the time of supplying an electric current in the positive direction or the negative direction.

2. A brushless polyphase DC motor according to claim 1, wherein said stator core contains a magnetic substance having high residual magnetization so as to extend the time taken for disappearance of said residual magnetization.

3. A brushless polyphase DC motor according to claim 2, wherein said stator core contains an annealed material of silicon electrical steel or an iron sheet material having a high carbon content.

4. A brushless polyphase DC motor according to claim 1, wherein said stator core contains a magnetic material having large magnetic after-effects in relation to the residual magnetic flux density so as to extend the time taken for disappearance of said residual magnetization.

5. A brushless polyphase DC motor according to claim 1, wherein the number of poles of said stator is 6 or 12.

6. A brushless polyphase DC motor according to claim 1, wherein said rotor has a magnet disposed thereon and divided into many magnetic poles.

7. A brushless polyphase DC motor according to claim 5, wherein the number of poles of said rotor is the same as that of said stator.

8. A brushless polyphase DC motor according to claim 5, wherein said magnet of said rotor comprises a rare earth magnet.

* * * * *